No. 668,244. Patented Feb. 19, 1901.
U. S. WOHLGAMUTH & G. R. WILLIAMS.
BOILER CLEANER.
(Application filed June 22, 1900.)
(No Model.)
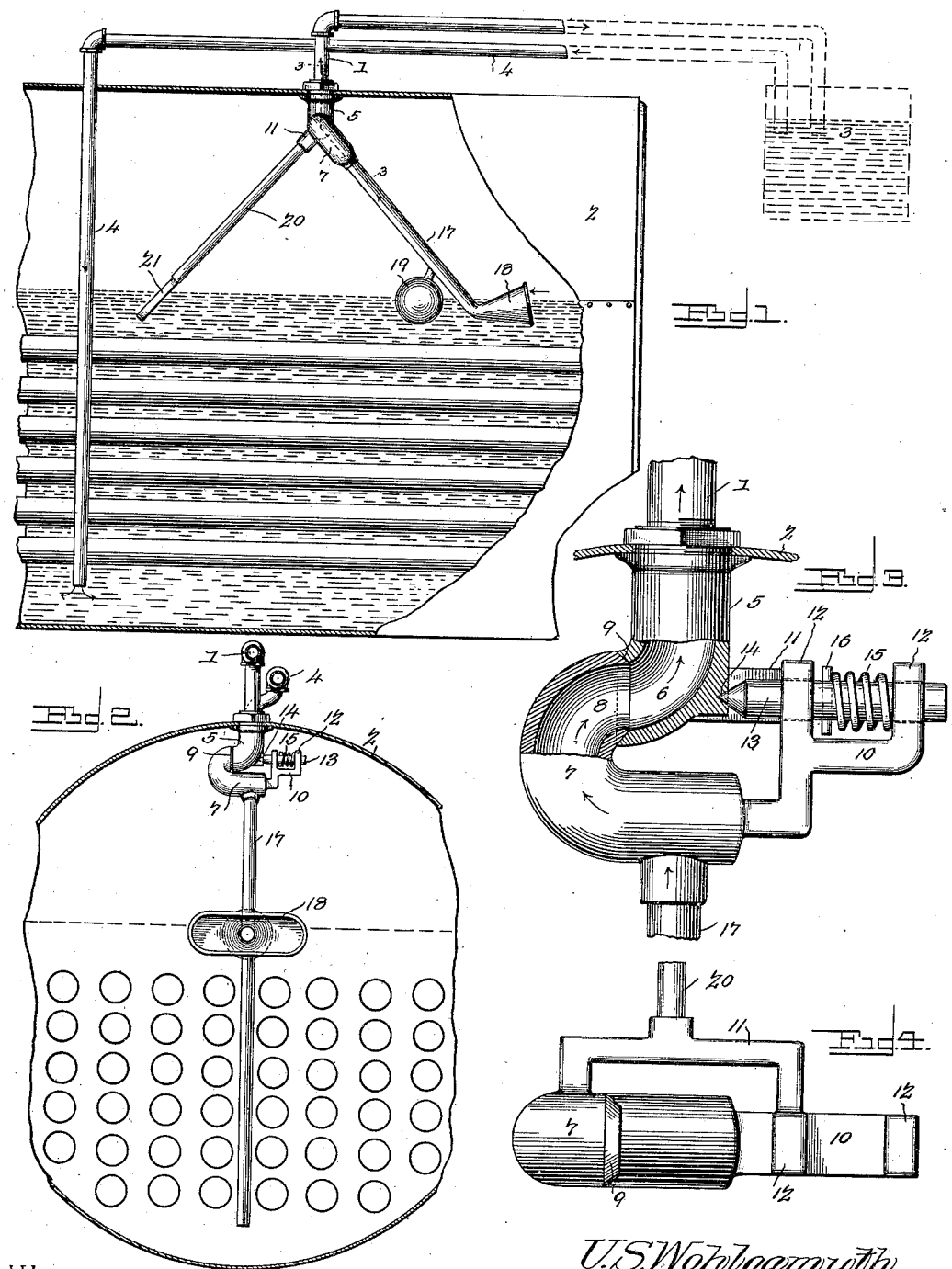
Witnesses
E. K. Stewart
J. W. Garner
U. S. Wohlgamuth
G. R. Williams Inventors
by C. A. Snow & Co.
Attorneys

UNITED STATES PATENT OFFICE.

ULYSSES S. WOHLGAMUTH AND GEORGE R. WILLIAMS, OF FINDLAY, OHIO.

BOILER-CLEANER.

SPECIFICATION forming part of Letters Patent No. 668,244, dated February 19, 1901.

Application filed June 22, 1900. Serial No. 21,222. (No model.)

*To all whom it may concern:*

Be it known that we, ULYSSES S. WOHLGAMUTH and GEORGE R. WILLIAMS, citizens of the United States, residing at Findlay, in the county of Hancock and State of Ohio, have invented a new and useful Apparatus for Removing Impurities from the Water in Steam-Boilers, of which the following is a specification.

Our invention is an improved apparatus for removing impurities from the water in a steam-boiler to minimize the formation of scale therein and prevent priming; and it consists in the peculiar construction and combination of devices hereinafter fully set forth, and pointed out in the claims.

In the accompanying drawings, Figure 1 is a vertical longitudinal sectional view of a portion of a steam-boiler provided with apparatus embodying our improvements. Fig. 2 is a vertical transverse sectional view of the same. Figs. 3 and 4 are detail views.

In the embodiment of our invention we provide a pipe 1, which leads from the upper side of the boiler 2 to a receiving vessel 3, which we will call a "precipitator." A return-pipe 4 leads from the precipitator to a point near the lower side of the boiler. A coupling 5 is attached to the end of the pipe 1 within the boiler and depends therefrom. The said coupling is provided with a quarter-circular channel 6, which extends to one side thereof. A coupling member 7, which is curved, as shown, has its channel 8 communicating with the channel 6 of coupling 5, a ground-joint 9 being formed between said coupling 5 and member 7. The latter has an arm 10, which extends to one side thereof, and a yoke 11, which connects said arm 10 with the body of the member 7. The said arm 10 is provided with a pair of vertical ears 12. The pin 13 operates in openings in the said ears, and the inner end of said pin is tapered and stepped in a conical recess 14 in the side of the coupling 5 opposite the joint 9. A spring 15 is located on the pin 13 and bears against the inner side of the outer ear 12 and against the stop 16, with which the pin 13 is provided, the function of the said spring being to keep the coacting coupling members 5 7 in engagement with each other, the pin 13, together with the ground-joint 9, adapting the coupling member 7 to swing pivotally, as will be understood.

A tubular arm 17 is attached to the coupling member 7, depends therefrom, and is provided at its lower end with a skimming-funnel 18, which is widened and flattened, as shown. A float 19 is attached to the tubular arm 17 and depends therefrom at a point near the lower end of said tubular arm, the said float serving to maintain the skimming-funnel slightly below the surface of the water in the boiler, with the upper portion of the skimming-funnel slightly above the surface of the water. An arm 20 depends from the yoke 11 of the coupling member 7 and is disposed substantially at right angles to the tubular arm 17. A scale-plate 21 is attached to the lower end of the arm 20, and the superficial area of said scale-plate which is submerged in the water in the boiler is equal to the combined superficial areas of those portions of the skimming-funnel and the float 19 which are submerged. The arm 20 and scale-plate 21 counterbalance the tubular arm 17, skimming-funnel 18, and float 19, and the superficial area of said scale-plate being, as hereinbefore stated, equal to the superficial areas of the submerged portions of the skimming-funnel and float the equilibrium is preserved under all conditions, and hence the skimming-funnel is at all times maintained in its operative position slightly submerged in the water in the boiler and in position to receive the impurities which rise to the surface of the water.

In operation a circulation of water is maintained from the boiler through the tubular arm 17 and pipe 1 to the precipitator and from the latter through the pipe 4 back to the boiler. The impurities in the water in the boiler rise to the surface, are collected by the skimming-funnel 18, and pass through the same into the precipitator and are there collected, as will be understood. Hence the formation of scale in the boiler is minimized by our improved apparatus and the same is also efficient in preventing priming.

Having thus described our invention, we claim—

1. In apparatus of the class described, a flexible tubular joint, having a tubular arm provided with a skimming-funnel, and a counterbalancing scale-plate, substantially as described.

2. In apparatus of the class described, a tube having a quarter-circular channel extending to one side thereof and a seat on the side opposite the open end of said channel, a coupling member adapted to turn on said tube, having a channel communicating with that of the tube, and provided further with an extended arm and yoke, a spring-pressed pin carried by said arm and engaging the seat of said tube, a tubular arm leading from said coupling member and carrying a skimming-funnel, and a counterbalancing-arm attached to said yoke, substantially as described.

3. In apparatus of the class described, a tube having a channel opening on one side, and a seat opposite the center of the open end of said channel, in combination with a coupling member having a channel communicating with that of the tube and jointed to and adapted to turn on said tube, and a spring-pressed centering-pin carried by supports with which said coupling member is provided, said centering-pin engaging the said seat of said tube, substantially as described.

4. In apparatus for removing the impurities from water in a steam-boiler, a flexible tubular joint having a tubular arm provided with a skimming-funnel and a float to buoy the said tubular arm and skimming-funnel, an arm and scale-plate to counterbalance the tubular arm, skimming-funnel and buoy or float, the superficial area of the scale-plate being equal to the combined superficial areas of the submerged portions of the skimming-funnel and float, for the purpose set forth, substantially as described.

In testimony that we claim the foregoing as our own we have hereto affixed our signatures in the presence of two witnesses.

ULYSSES S. WOHLGAMUTH.
GEORGE R. WILLIAMS.

Witnesses:
 ED. V. BOPE,
 J. A. BOPE.